United States Patent [19]
Biffert et al.

[11] Patent Number: 6,142,287
[45] Date of Patent: Nov. 7, 2000

[54] PRODUCT INVERTING AND DIVERSION SYSTEM

[76] Inventors: Kevin N. Biffert, 706 - 38th St. NW., Suite A, Fargo, N. Dak. 58102; James A. Pearson, 38254 County Rd. 186, Sauk Centre, Minn. 56378; Benjamin J. Ruona, R.R. 1, Box 62, Fairfax, Minn. 55332

[21] Appl. No.: 09/313,098

[22] Filed: May 17, 1999

[51] Int. Cl.[7] ............ B65G 15/00; B65G 17/00; B65G 29/00; B65G 47/24
[52] U.S. Cl. ............ 198/404; 198/403; 198/402
[58] Field of Search ............ 198/379, 402, 198/403, 404, 405

[56]            References Cited
                U.S. PATENT DOCUMENTS

| | | | |
|---|---|---|---|
| 3,948,385 | 4/1976 | Shinomiya | 198/403 |
| 4,344,727 | 8/1982 | Chaloupka | 198/403 X |
| 4,523,670 | 6/1985 | Yanagisawa et al. | 198/403 |
| 5,297,568 | 3/1994 | Schmid | 198/404 X |
| 5,515,796 | 5/1996 | Ogle et al. | 198/403 X |
| 5,823,317 | 10/1998 | Bankuty et al. | 198/403 X |
| 5,836,438 | 11/1998 | Jung | 198/402 |

*Primary Examiner*—Christopher P. Ellis
*Assistant Examiner*—Gene O. Crawford
*Attorney, Agent, or Firm*—Michael S. Neustel

[57]            ABSTRACT

A product inverting and diversion system for selectively inverting, diverting or skipping various types of products transported upon a high-speed conveyor system. The inventive device includes a frame, a pair of side members, a pair of first shafts and a pair of second shafts rotatably attached between the side members, a first belt and a second belt respectively positioned about the first shafts and second shafts defining a passageway between thereof, a pivot shaft attached to one of the side members, a drive shaft rotatably attached to one of the side members opposite of the pivot shaft, a drive belt connected between the drive shaft and a drive motor, and a pivot belt connected between the pivot shaft and a servo motor. A secondary belt is connected between the drive shaft and the first shafts and second shafts. The first belt and the second belt are rotated opposite of one another with the top surface of the lower belt moving in the same direction as an incoming conveyor and an outgoing conveyor thereby allowing the passing through of product. The electronic control circuitry determines whether the incoming product member on the incoming conveyor should be inverted, diverted, or skipped. If the product member is to be inverted, the servo rotates the pivot shaft thereby inverting the product member 180 degrees. The new lower belt then manipulates the product member onto the outgoing conveyor.

20 Claims, 10 Drawing Sheets

PRODUCT INVERTING AND DIVERSION SYSTEM

BACKGROUND OF THE INVENTION

1. Field of the Invention

The present invention relates generally to conveyor systems and more specifically it relates to a product inverting and diversion system for selectively inverting, diverting or skipping various types of products transported upon a high-speed conveyor system.

Manufacturers often times will require products upon a conveyor system to be inverted for packaging and other purposes. For example, every other floor tile on a conveyor system needs to be inverted so that the finished surfaces are juxtaposed to one another thereby preventing damage to the finished surfaces during transporting. Manufacturers also divert defective products upon the conveyor system to avoid having defective products packaged and distributed. Conventional methods of inverting and diverting products upon a high-speed conveyor system generally comprise many workers who manually invert or divert the products upon the conveyor system. Conventional methods of inverting and diverting products upon a conveyor system are extremely expensive and inefficient. Hence, there is a need for a device that is capable of inverting, diverting or skipping various types of products without the need for many workers.

2. Description of the Prior Art

Product conveyor systems have been in use for years. Typically, a conventional conveyor system is comprised of a plurality of conveyors that transport the product to a desired location. Along the length of the conventional conveyor system, workers invert and divert selected products as desired.

Hiring the required number of workers to invert and divert product upon a conventional conveyor system is expensive. In addition, over extended periods of time workers tend to become tired and become less accurate in inverting and diverting the product upon the conventional conveyor system. Also, the conventional conveyor system mist either be extended in length or have parallel conveyors to accommodate the large number of employees thereby requiring a significant amount of floor space within the manufacturing facilities.

Examples of inverting devices include U.S. Pat. No. 3,895,722 to Pluntz; U.S. Pat. No. 4,573,863 to Picotte; U.S. Pat. No. 4,793,463 to Kane; U.S. Pat. No. 5,515,796 to Ogle et al.; U.S. Pat. No. 5,341,910 to Sauer; U.S. Pat. No. 3,948,385 to Shinomiya; U.S. Pat. No, 4,523,670 to Yanagisawa et al.; U.S. Pat. No. 5,458,227 to Wheeler et al. which are all illustrative of such prior art.

Pluntz (U.S. Pat. No. 3,895,722) discloses a box inverting apparatus for inverting boxes of different heights in conjunction with an in-feed conveyor and an out-feed conveyor. Pluntz teaches a pair of opposing conveyor segments that are changed to clamp upon a box and thereafter inverting the box into a released position onto the out-feed conveyor.

Picotte (U.S. Pat. No. 4,573,863) discloses a fluid driven tube positioner. Picotte teaches a pair of opposing clamp arms for clamping upon the product and inverting it thereafter lowering the product upon the conveyor.

Kane (U.S. Pat. No. 4,793,463) discloses a turnover device. Kane teaches a frame, two spaced apart and parallel axis, first and second carrier arms mounted respectively upon the axes for rotational movement, first and second meshing gears mounted on the axes respectively, and a drive motor and lever.

While these devices may be suitable for the particular purpose to which they address, they are not as suitable for selectively inverting, diverting or skipping various types of products transported upon a high-speed conveyor system. Conventional conveyor systems are generally incapable of providing high-speed inverting or diverting of product functions. In addition, conventional conveyor systems require many workers to invert and divert the product.

In these respects, the product inverting and diversion system according to the present invention substantially departs from the conventional concepts and designs of the prior art, and in so doing provides an apparatus primarily developed for the purpose of selectively inverting, diverting or skipping various types of products transported upon a high-speed conveyor system.

SUMMARY OF THE INVENTION

In view of the foregoing disadvantages inherent in the known types of conveyor systems now present in the prior art, the present invention provides a new product inverting and diversion system construction wherein the same can be utilized for selectively inverting, diverting or skipping various types of products transported upon a high-speed conveyor system.

The general purpose of the present invention, which will be described subsequently in greater detail, is to provide a new product inverting and diversion system that has many of the advantages of the product inverting devices mentioned heretofore and many novel features that result in a new product inverting and diversion system which is not anticipated, rendered obvious, suggested, or even implied by any of the prior art inverting devices, either alone or in any combination thereof.

To attain this, the present invention generally comprises a frame, a pair of side members, a pair of first shafts and a pair of second shafts rotatably attached between the side members, a first belt and a second belt respectively positioned about the first shafts and second shafts defining a passageway between thereof, a pivot shaft attached to one of the side members, a drive shaft rotatably attached to one of the side members opposite of the pivot shaft, a drive belt connected between the drive shaft and a drive motor, and a pivot belt connected between the pivot shaft and a servo motor. A secondary belt is connected between the drive shaft and the first shafts and second shafts. The first belt and the second belt are rotated opposite of one another with the top surface of the lower belt moving in the same direction as an incoming conveyor and an outgoing conveyor thereby allowing the passing through of product. Sensors attached to the frame determine whether a product member is entering the passageway between the first belt and second belt. The electronic control circuitry determines whether the incoming product member on the incoming conveyor should be inverted, diverted, or skipped. If the product member is to be inverted, the servo rotates the pivot shaft thereby inverting the product member 180 degrees. The new lower belt then manipulates the product member onto the outgoing conveyor. If the product member is to be diverted, the product member is rotated less than 180 degrees where it is diverted onto a diversion conveyor.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a product inverting and diversion system that will overcome the shortcomings of the prior art devices.

Another object is to provide a product inverting and diversion system that is capable of inverting, diverting or skipping selected products.

An additional object is to provide a product inverting and diversion system that is operational upon high-speed conveyor systems with speeds of approximately 150 products per minute.

A further object is to provide a product inverting and diversion system that can be utilized within most existing conventional conveyor systems.

Another object is to provide a product inverting and diversion system that significantly reduces the number of workers required upon a conveyor system.

A further object is to provide a product inverting and diversion system that is capable of inverting and diverting various sizes and shapes of products within the same system.

A further object is to provide a product inverting and diversion system that significantly increases the efficiency of a conveyor system.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference character designate the same or similar parts throughout the several views, and wherein.

DESCRIPTION OF THE PREFERRED EMBODIMENT

Figure 1:
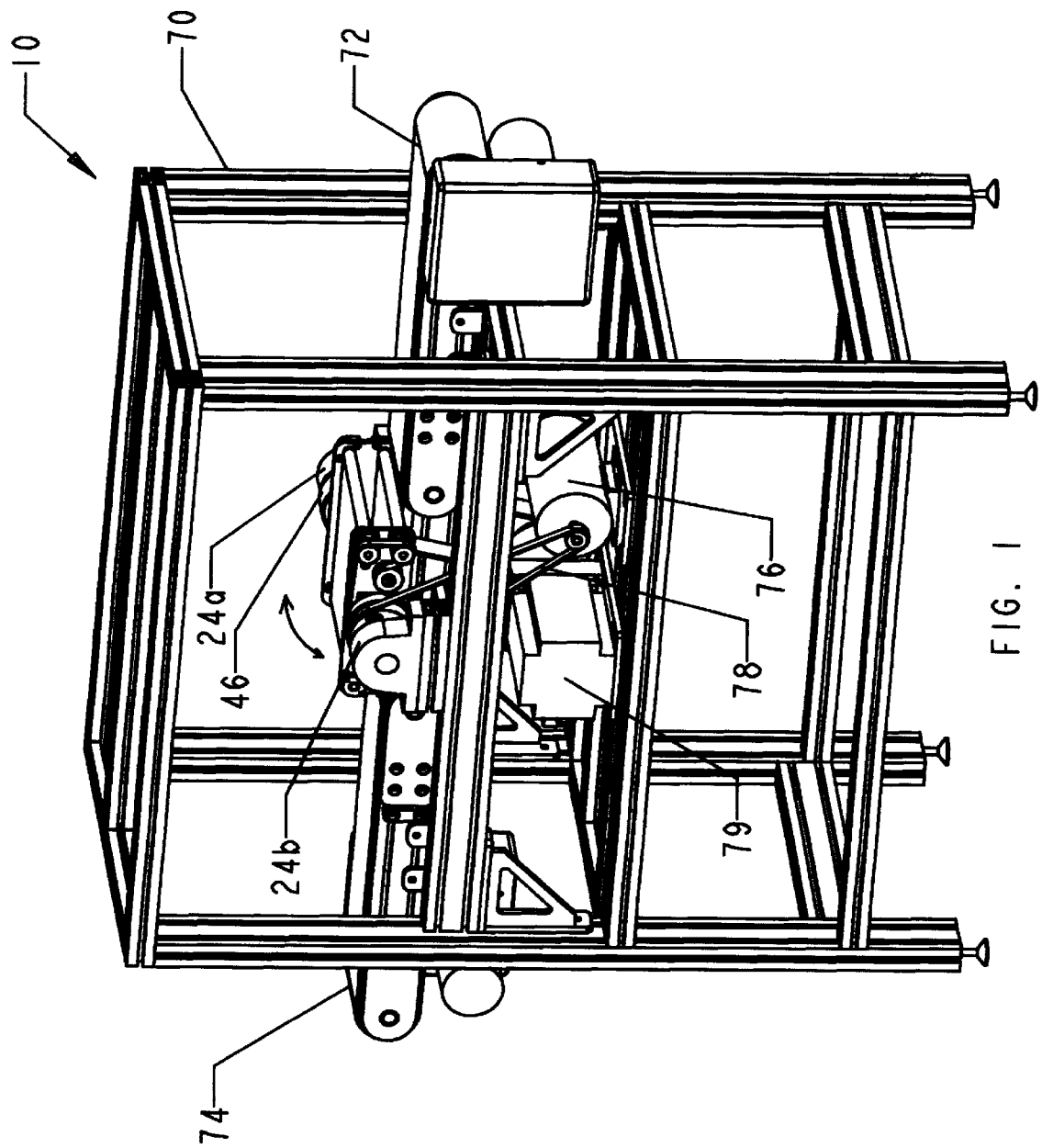
FIG. 1 is an upper perspective view of the present invention within a frame structure.

Turning now descriptively to the drawings, in which similar reference character; denote similar elements throughout the several view, FIGS. 1 through 10 illustrate a product inverting and diversion system 10, which comprises a frame 70, a pair of side members 20a–b, a pair of first shafts 50a–b and a pair of second shafts 60a–b rotatably attached between the side members 20a–b, a first belt 52 and a second belt 62 respectively positioned about the first shafts 50a–b and second shafts 60a–b defining a passageway between thereof, a pivot shaft 40 attached to one of the side members 20a–b, a drive shaft 30 rotatably attached to one of the side members 20a–b opposite of the pivot shaft 40, a drive belt 78 connected between the drive shaft 30 and a drive motor 76, and a pivot belt 46 connected between the pivot shaft 40 and a servo 79 motor. A secondary belt 66 is connected between the drive shaft 30 and the first shafts 50a–b and second shafts 60a–b. The first belt 52 and the second belt 62 are rotated opposite of one another with the top surface of the lower belt moving in the same direction as an incoming conveyor 72 and an outgoing conveyor 74 thereby allowing the passing through of product. Sensors 12 attached to the frame 70 determine whether a product member is entering the passageway between the first belt 52 and second belt 62. The electronic control circuitry 16 determines whether the incoming product member on the incoming conveyor 72 should be inverted, diverted, or skipped If the product member is to be inverted, the servo 79 rotates the pivot shaft 40 thereby inverting the product member 180 degrees. The new lower belt then manipulates the product member onto the outgoing conveyor 74. If the product member is to be diverted, the product member is rotated less than 180 degrees where it is diverted onto a diversion conveyor.

As shown in FIG. 1 of the drawings, a frame 70 is provided that supports the inverting/diverting structure. As can be appreciated by one skilled in the art, the frame 70 may be comprised of various types of materials and may be formed into various shapes depending upon the user's needs.

As further shown in FIG. 1 of the drawings, an incoming conveyor 72 is positioned adjacent to the inverting/diverting structure for feeding product members into the inverting/diverting structure. As further shown in FIG. 1 of the drawings, an outgoing conveyor 74 is positioned adjacent the inverting/diverting structure opposite of the incoming conveyor 72 for receiving the inverted or skipped product members. The incoming conveyor 72 and out going conveyor are comprised of conventional assemblies such as belts or rollers.

As further shown in FIG. 1 of the drawings, a drive motor 76 is attached to the frame 70 preferably below the inverting/diverting structure. The drive motor 76 is comprised of any well-known electric motor for constantly rotating the first belt 52 and second belt 62. A servo 79 is attached to the frame 70 preferably below the inverting/diverting structure. The servo 79 is comprised of any well-known motor for accurately and selectively rotating the entire inverting/diverting structure. The servo 79 is preferably comprised of a high speed assembly for providing adequate inverting and diverting movements.

As shown in FIG. 1 of the drawings, a pair of support housings 24 are attached to the frame 70 for rotatably supporting the inverting/diverting structure. The support housings 24 may have any well-known shape and structure as can be appreciated by one skilled in the art.

Figure 2:
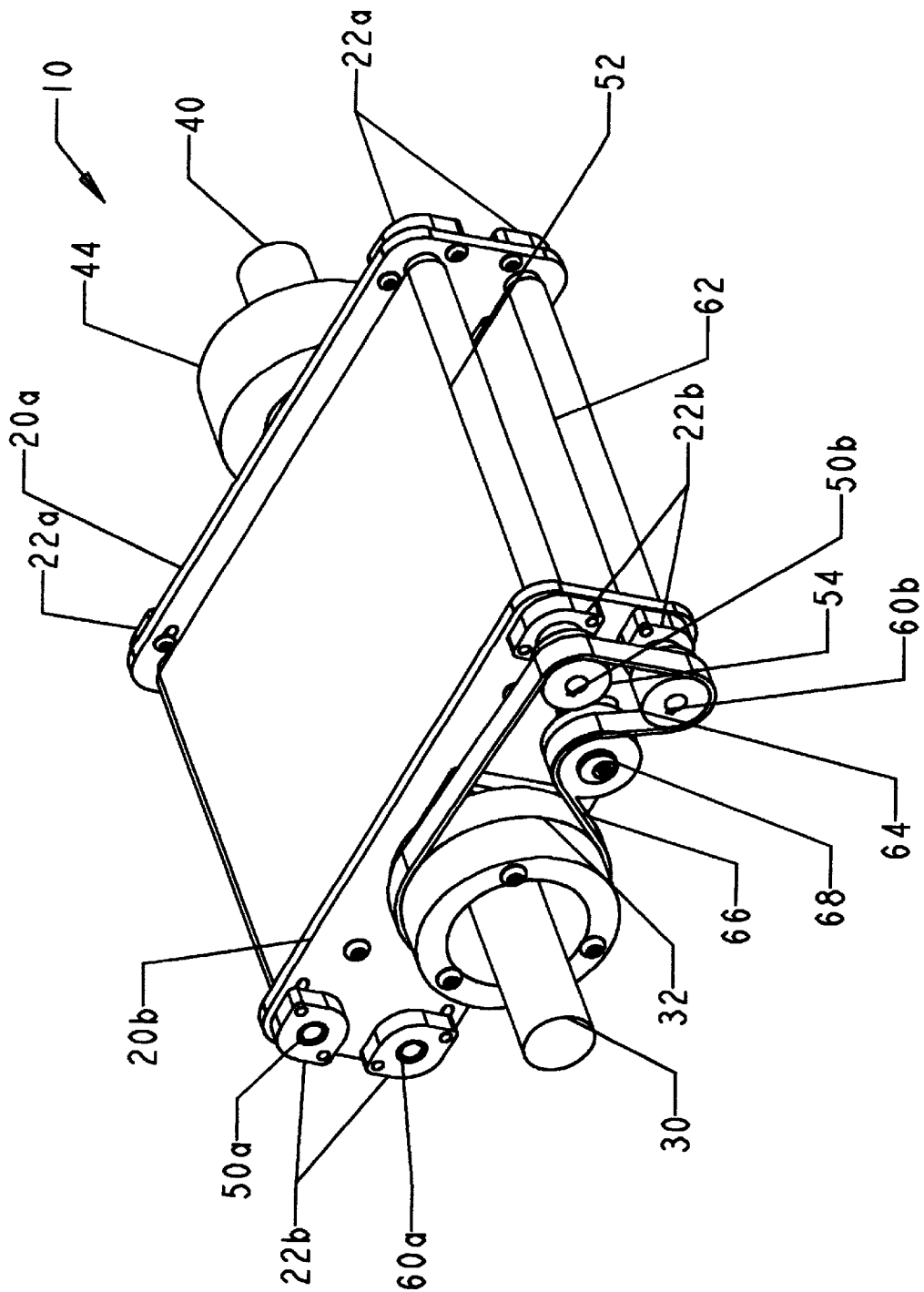
FIG. 2 is an upper perspective view of the present invention.
Figure 3:
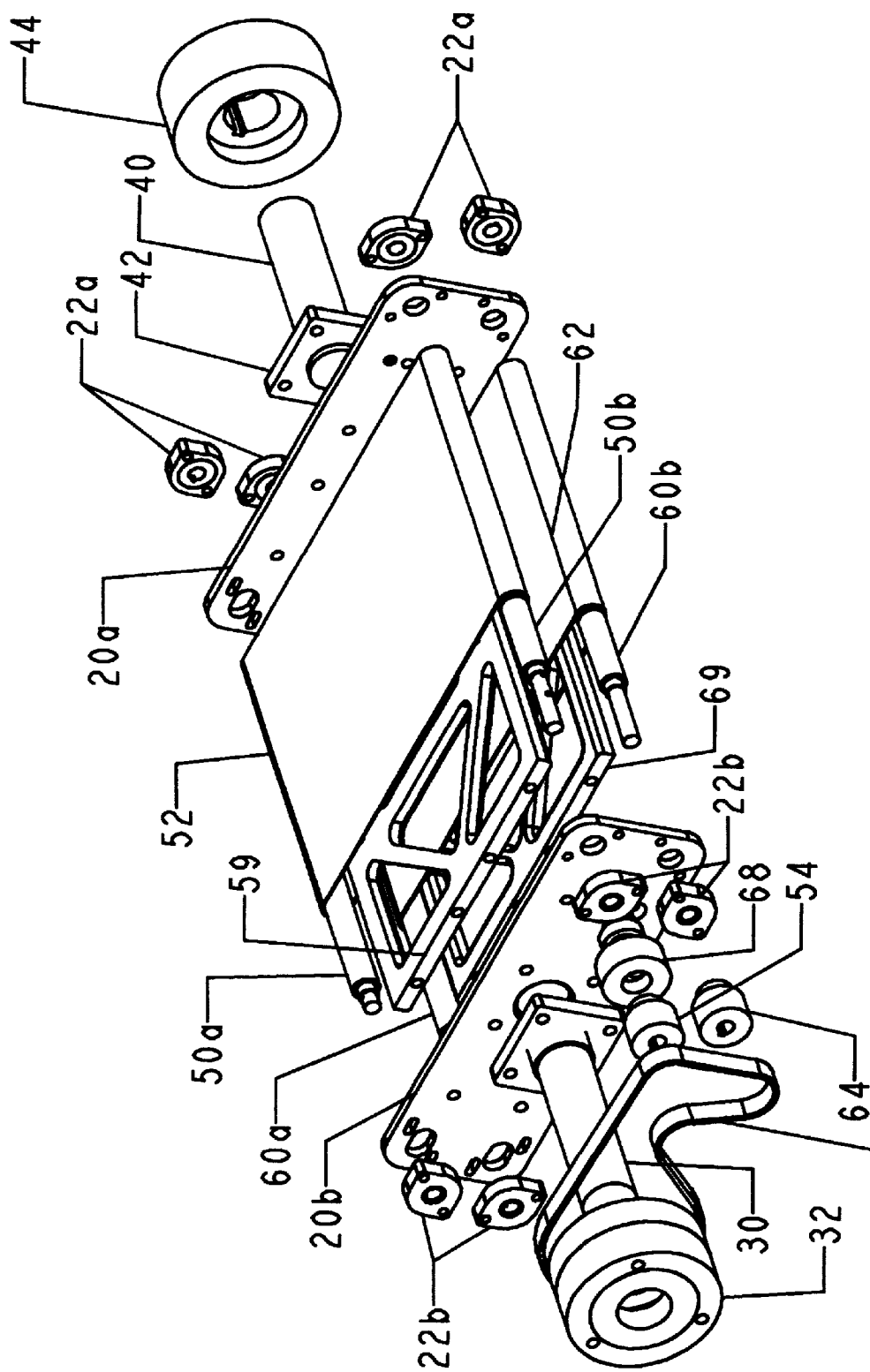
FIG. 3 is an exploded upper perspective view of the present invention.

As shown in FIGS. 2 through 6 of the drawings, the inverting/diverting structure includes a pair of side members 20a–b distally spaced from one another. A drive shaft 30 is rotatably attached to the side member 20b as best shown in FIGS. 2 and 3 of the drawings. The distal end of the drive shaft 30 is rotatably connected within the support housing 24b as shown in FIG. 1 of the drawings.

Figure 4:
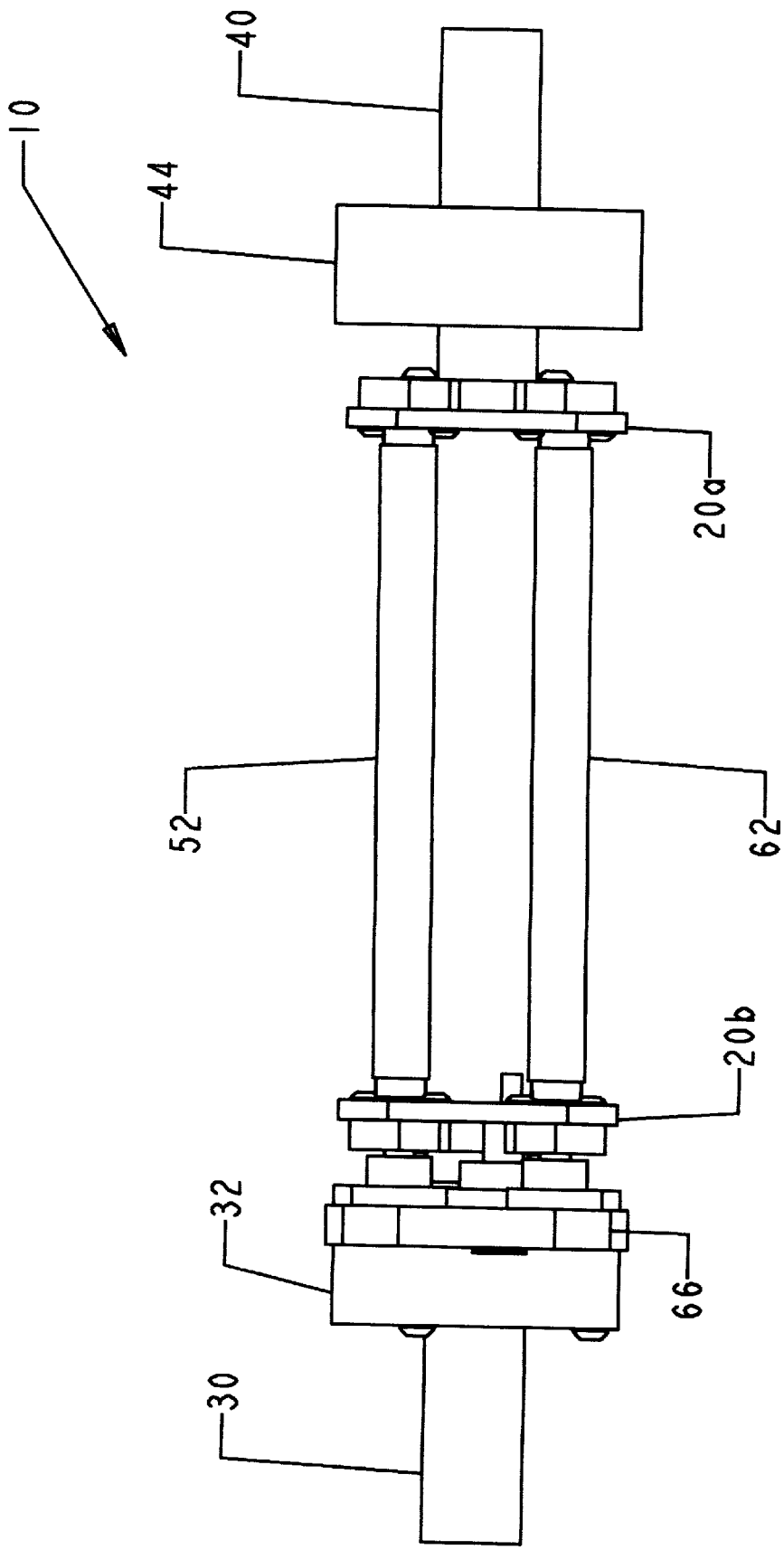
FIG. 4 is a front end view of the present invention.
Figure 5:
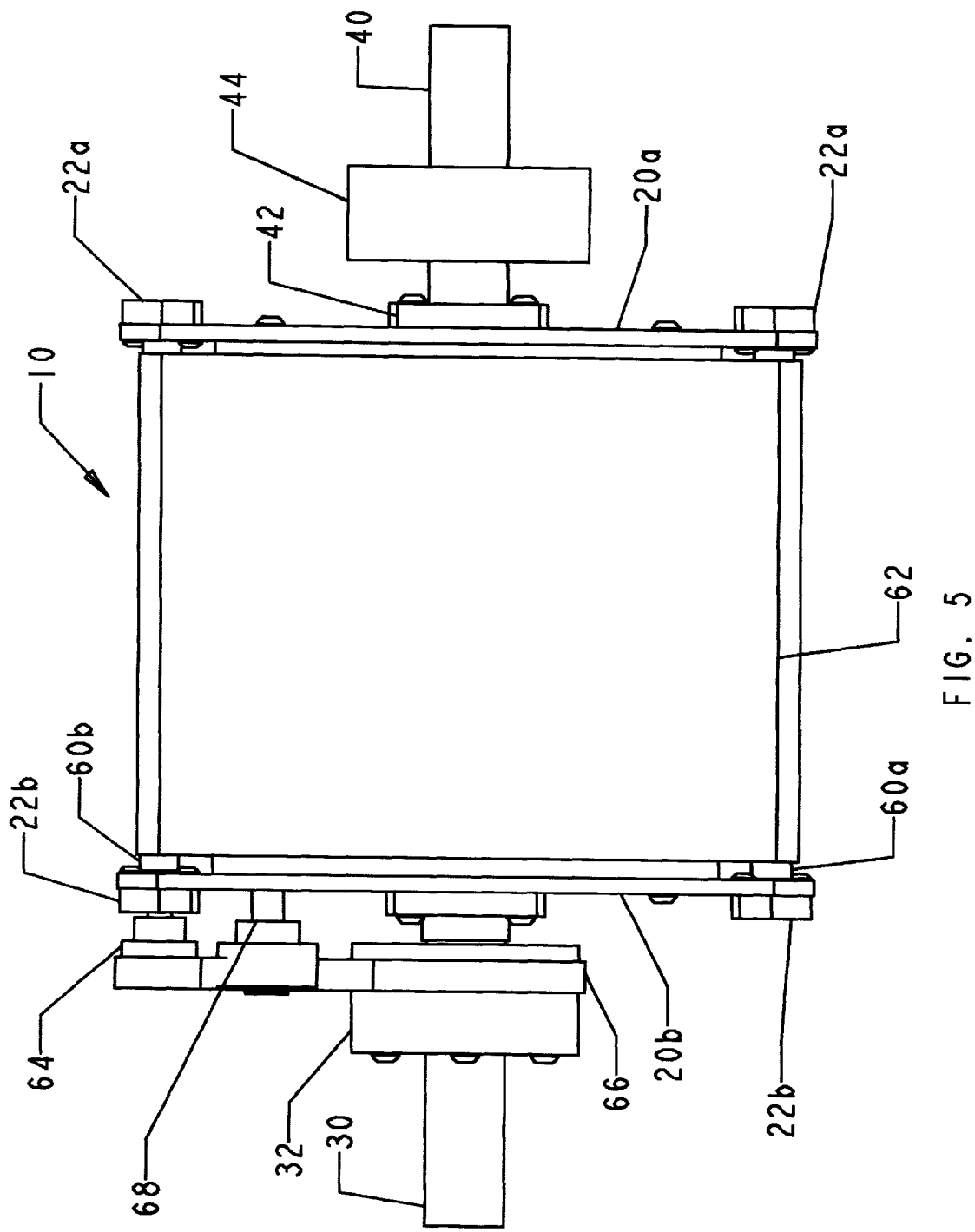
FIG. 5 is a top view of the present invention.
Figure 6:
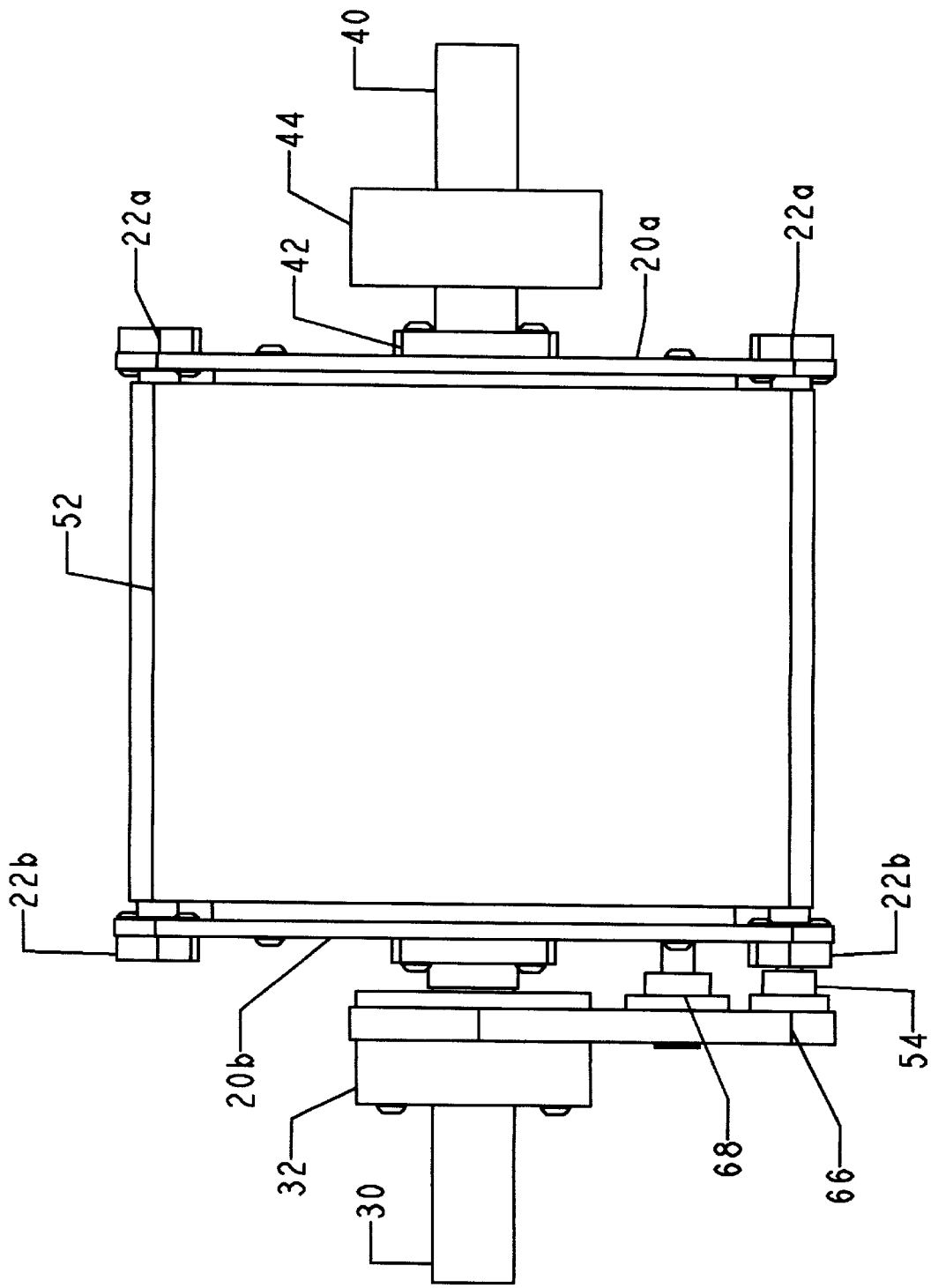
FIG. 6 is a bottom view of the present invention.
Figure 7:
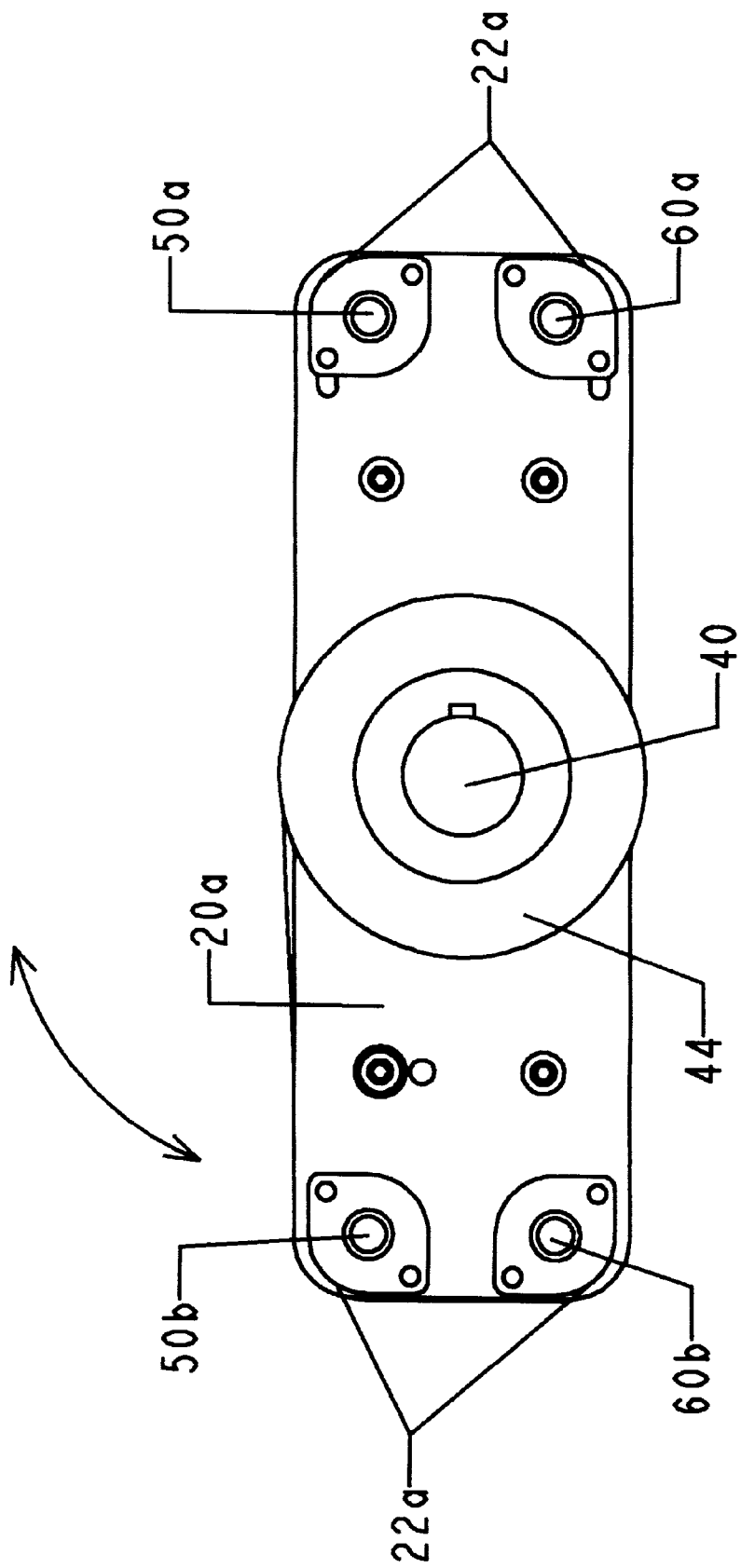
FIG. 7 is right side view of the present invention showing the pivot shaft and pivot pulley.

A drive pulley 32 is attached about the drive shaft 30 as shown in FIGS. 2 through 4 of the drawings. A drive belt 78 or chain is connected between the drive pulley 32 and the drive motor 76 as best shown in FIG. 1 of the drawings. The drive motor 76 rotates the drive shaft 30 at various rotational speeds depending upon the relative speeds of the incoming conveyor 72 and the outgoing conveyor 74.

As best shown in FIGS. 2 through 7 of the drawings, a pivot shaft 40 is provided that has a bracket 42 attached to the distal end thereof. The bracket 42 is attached to the side member 20a opposite of the drive shaft 30 for permanently securing the pivot shaft 40 to the side member 20a. The distal end of the pivot shaft 40 is rotatably supported by the support housing 24b as shown in FIG. 1 of the drawings.

A pivot pulley 44 is attached about the pivot shaft 40 as shown in FIGS. 2 through 7 of the drawings. A pivot belt 46 or chain is connected between the pivot pulley 44 and the servo 79 as best shown in FIG. 1 of the drawings. The servo 79 selectively rotates the pivot shaft 40 at a high rotational speed for inverting or diverting a product within the passageway of the inverting/diverting structure.

As best shown in FIG. 3 of the drawings, a pair of first shafts 50a–b rotatably extend between the pair of side members 20a–b. The pair of first shafts 50a–b are rotatably supported upon the side members 20a–b by a corresponding pair of bearings 22a–b. An endless first belt 52 is wrapped about the pair of first shafts 50a–b forming an upper plane. A first support 59 is preferably extended between the pair of side members 20a–b as best shown in FIG. 3 of the drawings. The first support 59 provides support to the first belt 52 when a product member is being inverted, diverted or skipped.

As best shown in FIG. 3 of the drawings, a pair of second shafts 60a–b rotatably extend between the pair of side members 20a–b. The pair of second shafts 60a–b are rotatably supported upon the side members 20a–b by a corresponding pair of bearings 22a–b. An endless second belt 62 is wrapped about the pair of second shafts 60a–b forming a lower plane. A second support 69 is preferably extended between the pair of side members 20a–b as best shown in FIG. 3 of the drawings. The second support 69 provides support to the second belt 62 when a product member is being inverted, diverted or skipped. The upper surface of the second belt 62 is parallel to and substantially level to the surfaces of the incoming conveyor 72 and outgoing conveyor 74 as shown in FIG. 1 of the drawings.

Figure 8:
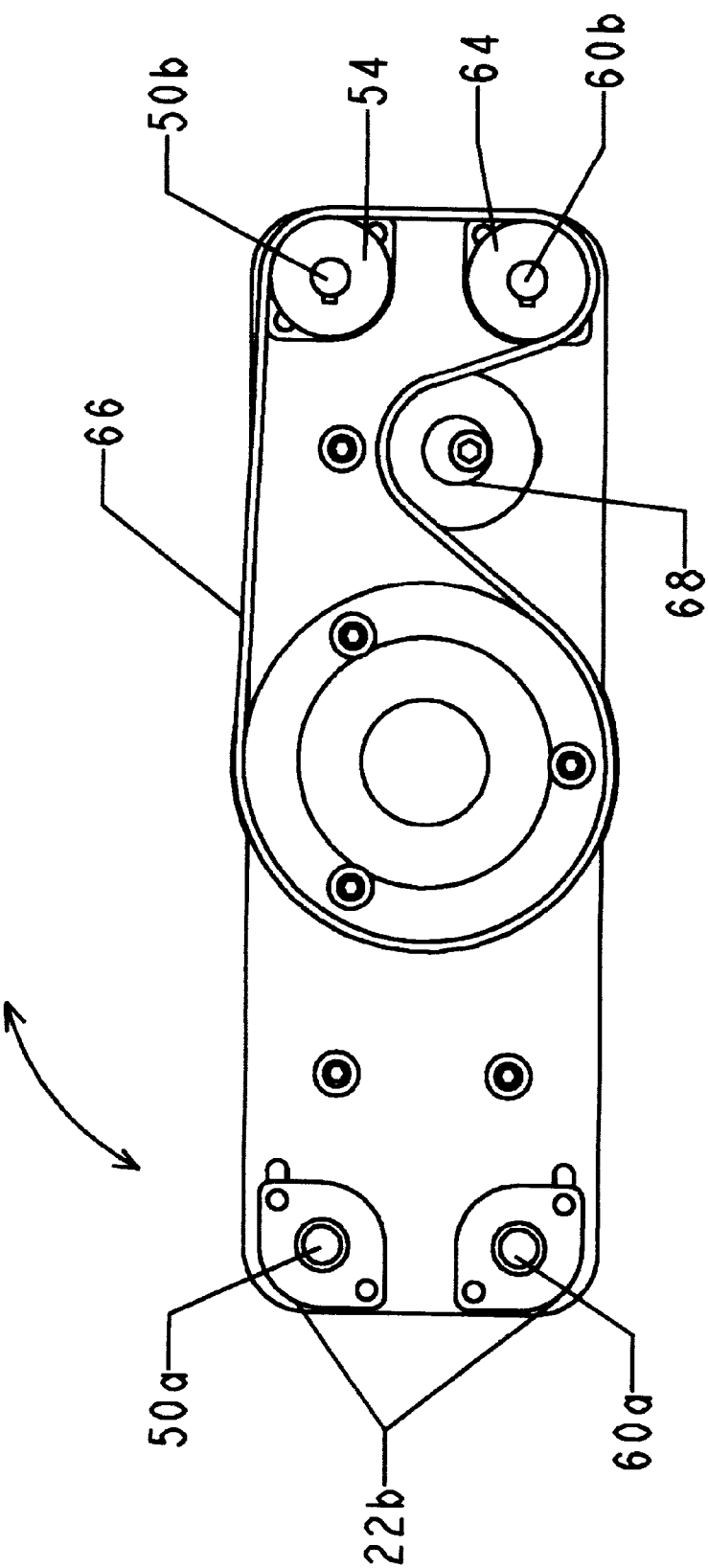
FIG. 8 is a left side view of the present invention showing the drive belt assembly.
Figure 9:
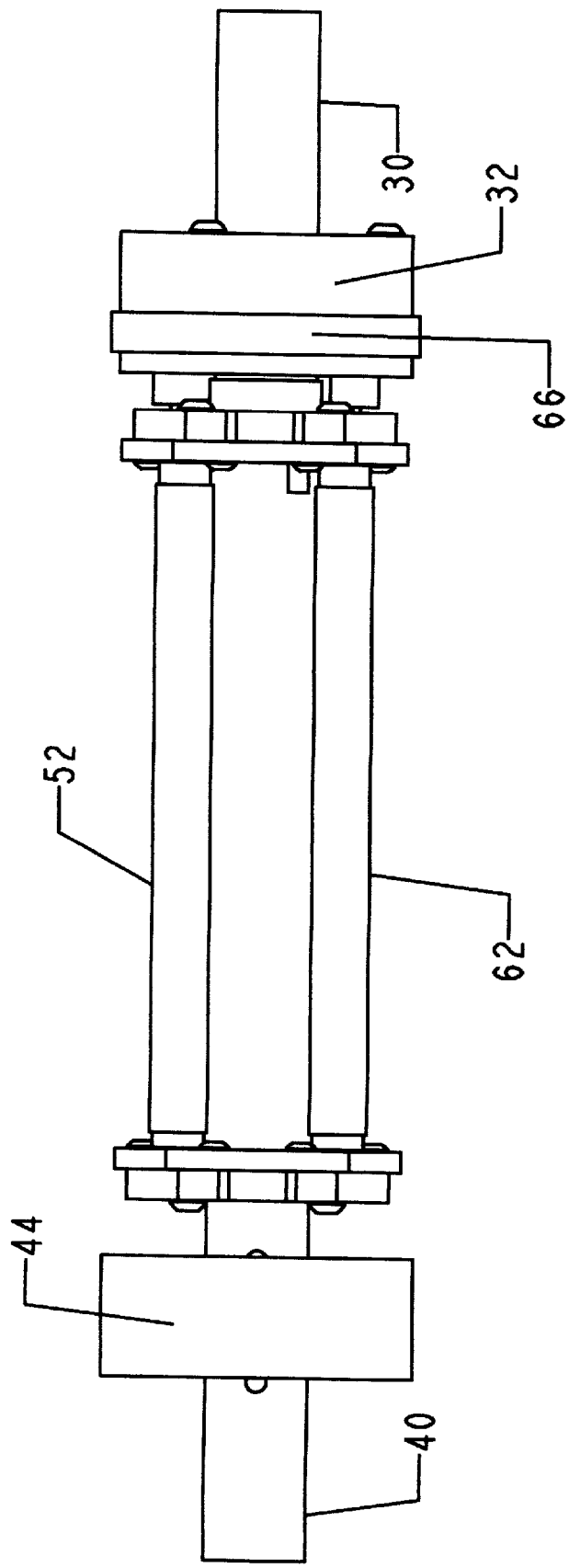
FIG. 9 is a rear end view of the present invention.

As best shown in FIG. 8 of the drawings, a first pulley 54 is attached to one of the first shafts 50a–b. As further shown in FIG. 8 of the drawings, a second pulley 64 is attached to one of the second shafts 60a–b. An idler 68 is rotatably attached to) the side member 20b as shown in FIG. 8 of the drawings. As further shown in FIG. 8 of the drawings, an endless secondary belt 66 is connected about the drive pulley 32, the idler 68, the first pulley 54 and the second pulley 64 for driving the first belt 52 and the second belt 62. The inner surfaces of the first belt 52 and second belt 62 in opposition to one another are moving counter to one another thereby always maintaining the same directional movement regardless of where the first belt 52 or the second belt 62 are positioned.

Figure 10:
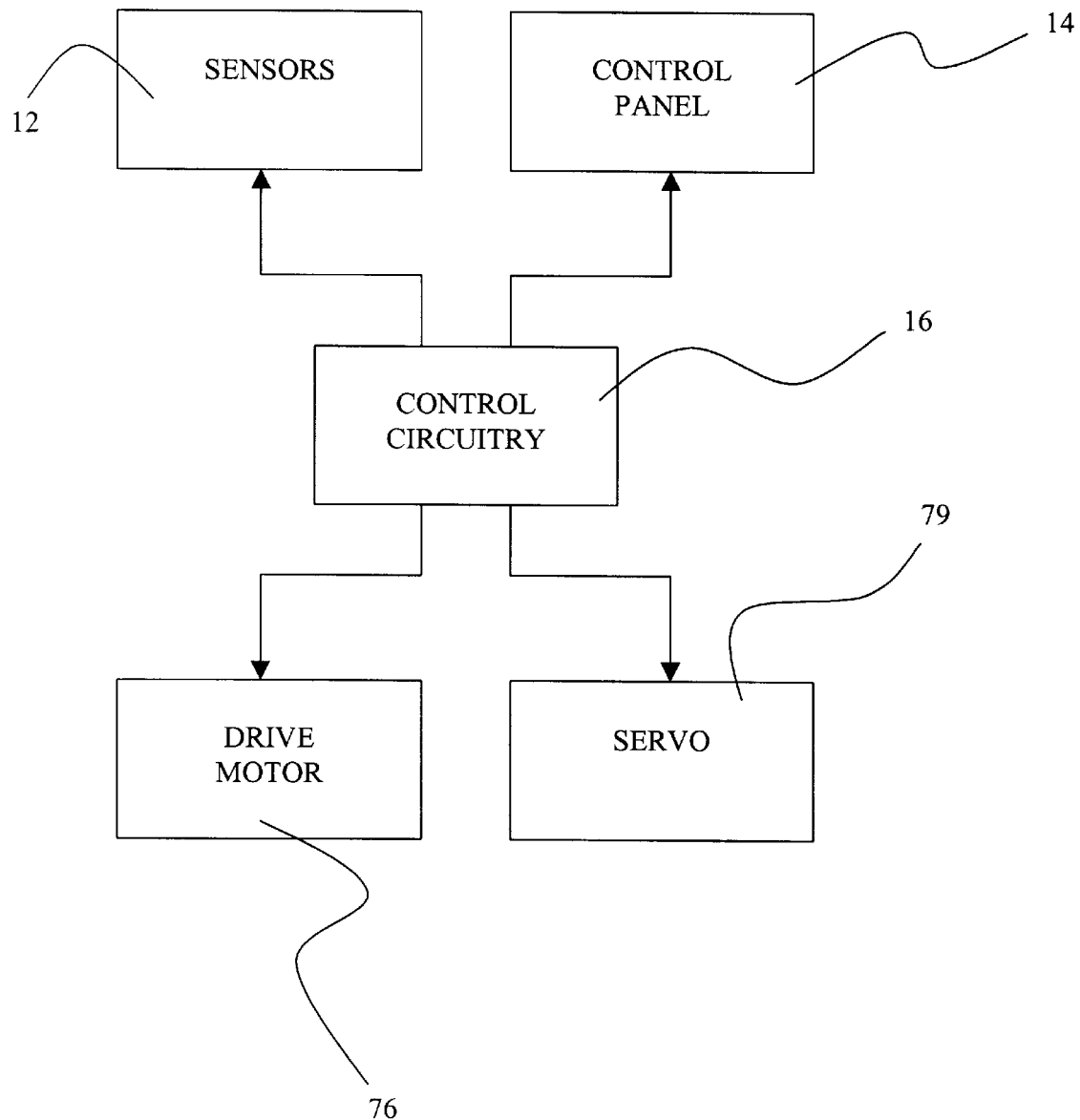
FIG. 10 is a box diagram illustration of the present invention showing the proposed connection of electrical components.

At least one sensor 12 is utilized to detect when the product member is exiting the incoming conveyor 72. Additional sensors 12 may be utilized to determine what type of product is exiting the incoming conveyor 72 or whether the product is defective. As shown in FIG. 10 of the drawings, the sensors 12 are electronically connected to an electronic control circuitry 16 that receives the electronic information from the sensors 12 regarding the type and position of the product upon the incoming conveyor 72. A control panel 14 is electrically connected to the control circuitry 16 for allowing manual control and inputting of data into the control circuitry 16. The drive motor 76 and servo 79 are electrically connected to the control circuitry 16 whereby the control circuitry 16 controls the operation thereof. The control circuitry 16 can be program to invert every other product upon the incoming conveyor 72 and divert certain types of products.

In use, the user programs the parameters and control data into the control circuitry 16 through the control panel 14. The user then begins operation of the invention. The incoming conveyor 72 and the outgoing conveyor 74 move in the same direction. The drive motor 76 rotates the drive shaft 30 thereby rotating the first belt 52 and the second belt 62 such that the top surface of the second belt 62 is moving in the same direction as the incoming conveyor 72 and outgoing conveyor 74. As shown in FIG. 1 of the drawings, the front edge of the second belt 62 is near the exit edge of the incoming belt thereby allowing product members to easily move from the incoming conveyor 72 onto the second belt 62. The product members are introduced upon the incoming conveyor 72. The product members are transported along the incoming conveyor 72 where sensors 12 detect the location and type of product continuously transmitting the data to the control circuitry 16. When a product member begins to pass from the incoming conveyor 72 onto the top surface of the second belt 62, one of the sensors 12 sends a signal to the control circuitry 16. The control circuitry 16 then determines from the parameters, control data, and sensors 12 whether the product member should be inverted, diverted or skipped. If the product member is to be skipped, the product member simply enters the second belt 62 and is moved by the second belt 62 onto the outgoing conveyor 74 without any rotation of the product member.

If the product member is to be inverted, the control circuitry 16 activates the servo 79 while the product member is upon the second belt 62. The servo 79 rotates the pivot shaft 40 180 degrees thereby rotating the entire inverting/ diverting structure. The rotation of the entire inverting/ diverting structure causes the first belt 52 and second belt 62 to momentarily stop rotating because of the same rotation of the inverting/diverting structure as the rotation of the drive shaft 30. Centrifugal force retains the product member juxtaposed to the second belt 62 during the 180 degree rotation. When the 180 degree rotation is finished the first belt 52 is on the bottom and the second belt 62 is on top. The product member drops to the first belt 52 which is moving the same direction as the incoming conveyor 72 and the outgoing conveyor 74. The product member then exits the first belt 52 onto the outgoing conveyor 74. The first belt 52 is now ready to receive the next product member and the process is simply repeated over and over again.

If the product member is to be diverted, the control circuitry 16 activates the servo 79 while the product member is upon the second belt 62. The servo 79 rotates the pivot shaft 40 less than 180 degrees thereby rotating the entire inverting/diverting structure. When the less than 180 degree rotation is finished the product member then exits the second belt 62 onto the diversion conveyor which is typically below either the incoming conveyor 72 or the outgoing conveyor 74. After the product has exited the second belt 62, the servo 79 is activated to place the second belt 62 parallel to the incoming belt in order to receive the next product member.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A product inverting and diversion system, comprising:
    a frame;
    an inverting/diverting structure pivotally attached to said frame, wherein said inverting/diverting structure includes a support structure;
    a first endless belt rotatably attached about said support structure;
    a second endless belt rotatably attached about said support structure wherein said second endless belt is in opposition to said first endless belt thereby defining a passageway between thereof;
    a means for rotating said first endless belt and said second endless belt in the same rotational direction; and
    a means for controllably pivoting said inverting/diverting structure for inverting a product member within said inverting/diverting structure.

2. The product inverting and diversion system of claim 1, wherein a front edge of said second belt is positionable between an incoming conveyor and an outgoing conveyer, wherein a top surface movement of said second belt is the same as the said incoming conveyor and said outgoing conveyor.

3. The product inverting and diversion system of claim 2, wherein a top surface of said second belt is substantially parallel to and even with said incoming conveyor and said outgoing conveyor.

4. The product inverting and diversion system of claim 1, wherein said support structure comprises:
    a pair of side members;
    a pair of first shafts rotatably attached between said pair of side members, wherein said first endless belt rotates upon said first shafts; and
    a pair of second shafts rotatably attached between said pair of side members, wherein said second endless belt rotates upon said second shafts.

5. The product inverting and diversion system of claim 4, wherein said support structure further includes:
    a first support attached between said pair of side members and within said first belt; and
    a second support attached between said pair of side members and within said second belt.

6. The product inverting and diversion system of claim 4, wherein said means for rotating comprises:
    a drive shaft rotatably attached to one of said pair of side members and rotatably supported upon said frame;
    a drive pulley attached to said drive shaft;
    a drive motor mechanically connected to said drive pulley for rotating said drive shaft; and
    a secondary belt connected to said drive pulley and to at least one of each of said first shafts and said second shafts.

7. The product inverting and diversion system of claim 6, wherein said means for controllably pivoting comprises:
    a pivot shaft attached to said pair of side members opposite of said drive shaft and rotatably supported upon said frame;
    a pivot pulley attached to said pivot shaft; and
    a servo mechanically connected to said pivot pulley for selectively pivoting said support structure.

8. The product inverting and diversion system of claim 7, wherein said means for rotating further comprises:
    a first pulley attached to one of said first pair of shafts;
    a second pulley attached to one of said second pair of shafts, wherein said first pulley and said second pulley are mechanically connected to said secondary belt.

9. The product inverting and diversion system of claim 8, wherein said means for rotating further includes an idler.

10. A product inverting and diversion system, comprising:
    a frame;
    an inverting/diverting structure pivotally attached to said frame, wherein said inverting/diverting structure includes a support structure;
    a means for controllably pivoting said inverting/diverting structure for inverting a product member within said inverting/diverting structure;
    a first endless belt rotatably attached about said support structure;
    a second endless belt rotatably attached about said support structure wherein said second endless belt is in opposition to said first endless belt thereby defining a passageway between thereof;
    a means for rotating said first endless belt and said second endless belt in the same rotational direction; and
    a control circuitry in communication with said means for controllably pivoting said inverting/diverting structure.

11. The product inverting and diversion system of claim 10, wherein a front edge of said second belt is positionable between an incoming conveyor and an outgoing conveyer, wherein a top surface movement of said second belt is the same as the said incoming conveyor and said outgoing conveyor.

12. The product inverting and diversion system of claim 11, wherein a top surface of said second belt is substantially parallel to and even with said incoming conveyor and said outgoing conveyor.

13. The product inverting and diversion system of claim 10, wherein said support structure comprises:
    a pair of side members;
    a pair of first shafts rotatably attached between said pair of side members, wherein said first endless belt rotates upon said first shafts; and a pair of second shafts rotatably attached between said pair of side members, wherein said second endless belt rotates upon said second shafts.

14. The product inverting and diversion system of claim 13, wherein said support structure further includes:

a first support attached between said pair of side members and within said first belt; and a second support attached between said pair of side members and within said second belt.

15. The product inverting and diversion system of claim 13, wherein said means for rotating comprises:

a drive shaft rotatably attached to one of said pair of side members and rotatably supported upon said frame;

a drive pulley attached to said drive shaft;

a drive motor mechanically connected to said drive pulley for rotating said drive shaft; and a secondary belt connected to said drive pulley and to at least one of each of said first shafts and said second shafts.

16. The product inverting and diversion system of claim 15, wherein said means for controllably pivoting comprises:

a pivot shaft attached to said pair of side members opposite of said drive shaft and rotatably supported upon said frame;

a pivot pulley attached to said pivot shaft; and a servo mechanically connected to said pivot pulley for selectively pivoting said support structure.

17. The product inverting and diversion system of claim 16, wherein said means for rotating further comprises:

a first pulley attached to one of said first pair of shafts;

a second pulley attached to one of said second pair of shafts, wherein said first pulley and said second pulley are mechanically connected to said secondary belt.

18. The product inverting and diversion system of claim 17, wherein said means for rotating further includes an idler.

19. A product inverting system, comprising:

a frame;

an inverting structure pivotally attached to said frame;

a first endless belt rotatably attached about said inverting structure;

a second endless belt rotatably attached about said inverting structure wherein said second endless belt is in opposition to said first endless belt thereby defining a passageway between thereof;

a means for rotating said first endless belt and said second endless belt in the same rotational direction; and a means for controllably pivoting said inverting structure within said frame for inverting a product member positioned within said inverting structure.

20. The product inverting and diversion system of claim 19, wherein said support structure comprises:

a pair of side members;

a pair of first shafts rotatably attached between said pair of side members, wherein said first endless belt rotates upon said first shafts; and a pair of second shafts rotatably attached between said pair of side members, wherein said second endless belt rotates upon said second shafts.

* * * * *